United States Patent [19]
Brown

[11] 3,892,037
[45] July 1, 1975

[54] GRASS CUTTING, TRIMMING AND EDGING DEVICE

[76] Inventor: Jimmy L. Brown, Gen. Del., Silverton, Oreg. 97381

[22] Filed: Nov. 23, 1973

[21] Appl. No.: 418,666

[52] U.S. Cl. ............. 30/276; 30/264; 30/347; 30/DIG. 5; 56/11.9; 56/17.5; 56/256; 56/295
[51] Int. Cl. ............. B26b 7/00; B26b 27/00
[58] Field of Search ........ 30/276, 264, 347, DIG. 5; 56/295, 17.5, 11.9, 256

[56] References Cited
UNITED STATES PATENTS

| | | | |
|---|---|---|---|
| 2,062,820 | 12/1936 | Pierce | 30/276 |
| 2,484,753 | 10/1949 | Shipley | 30/276 |
| 2,673,396 | 3/1954 | Beres | 30/DIG. 5 |
| 2,684,532 | 7/1954 | Sumstad | 30/276 |
| 2,697,457 | 12/1954 | Lawrence | 30/264 X |
| 2,882,600 | 4/1959 | Baker | 30/301 X |
| 3,050,854 | 8/1962 | Becker et al | 30/276 |
| 3,708,967 | 1/1973 | Geist et al | 56/295 |

FOREIGN PATENTS OR APPLICATIONS

| | | | |
|---|---|---|---|
| 1,281,450 | 12/1961 | France | 30/264 |
| 1,021,889 | 3/1966 | United Kingdom | 56/11.9 |

*Primary Examiner*—Al Lawrence Smith
*Assistant Examiner*—J. T. Zatarga

[57] ABSTRACT

This device consist primarily of an electric motor with a rotating nylon member for cutting purposes, the motor having a handle for horizontal edging and a removeable handle for vertical edging, the device including speed and switch control means for efficient handling thereof.

1 Claim, 1 Drawing Figure

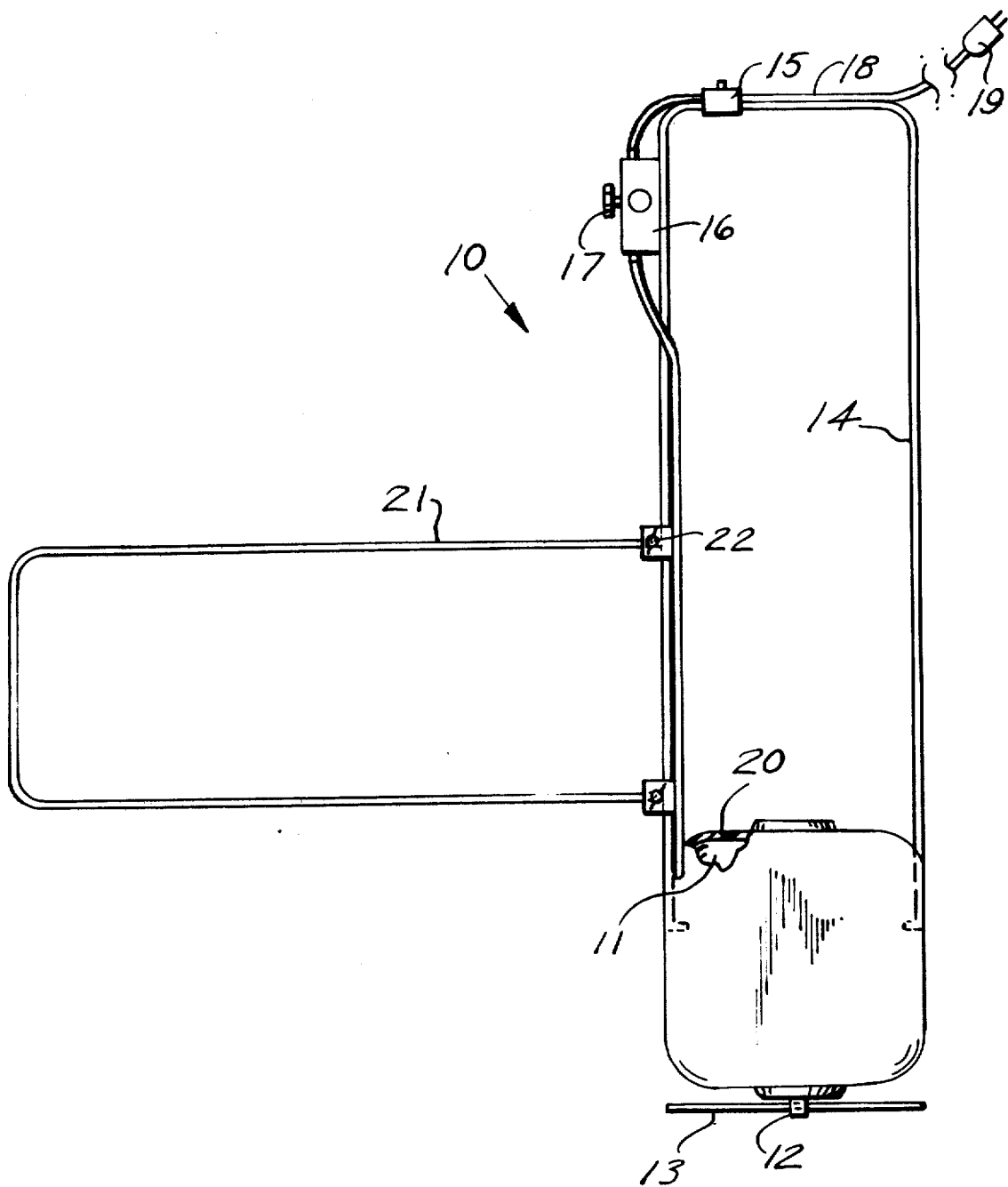

GRASS CUTTING, TRIMMING AND EDGING DEVICE

This invention relates to grass cutting devices, and more particularly to a trimming, cutting, and edging device.

It is therefore the principal object of this invention to provide a grass cutting device which will safely cut, trim, and edge grass and will completely eliminate hand clipping, even under chain link fences.

Another object of this invention is to provide a cutting device which will not cut clothing, electrical cords, paint on walls and fences, bark on trees, plastic sprinkler heads and will not throw rocks as metal steel blades do.

Another object of this invention is to provide a device of the type described, which when in use, will be cleaned, safe, and quiet in the operation.

A further object of this invention is to provide a device of the type described, which will be light in weight and will utilize nylon cord means for severing the blades of grass.

A still further object of this invention is to provide a cutting device of the type described, which will have handle means secured to the electric motor of the device for horizontal edging and an auxiliary handle will be removeable therefrom, the auxiliary handle enabling the device to be used for vertical edging.

Other objects of the invention are to provide a cutting device which is simple in design, inexpensive to manufacture, rugged in construction, easy to use and efficient in operation.

These and other objects will be readily evident upon a study of the following specification and the accompanying drawing, wherein:

The drawing is the sole view of the present invention.

According to this invention, a cutting device 10 is shown to include an electric motor 11, the shaft 12 of which, is secured to a nylon cord 13, the ends extending equally in length from opposite sides of the shaft 12. A U-shaped handle 14 for horizontal edging, is secured fixedly at its ends, to the sides of electric motor 11. An on-off switch 15 and a speed control reostat 16 are secured fixedly to the outer end of handle 14 and the speed control reostat 16 is provided with a knob 17 for setting the speed of motor 11. The electrical wiring of device 10 is carried within cord 18 which extends through reostat 16 and switch 15, the cord 18 having plug 19 means for plugging device 10 into a suitable electrical outlet. The motor 11 of device 10 is encased within a plastic casing 20 which acts as insulation for device 10 when in use. A U-shaped handle 21 for vertical edging with device 10, is secured at its ends, to one side of handle 14, by means of wing nut and bolt fasteners 22 so as to enable easy removal of handle 21 from handle 14 when desired. In use, for horizontal edging, handle 14 is grasped in the hands of the user so as to enable the nylon cord 13 to cut or edge grass horizontally when switch 15 is turned to the on position.

When it is desired to use device 10 for vertical edging, handle 21 is grasped by the user so as to enable the cord 13 when rotated, to vertically edge grass.

What I now claim is:

1. A grass trimming, edging and cutting device, comprising in combination, an electric motor, a motor shaft driven by said motor, a nylon cord secured at its longitudinal center on said shaft for rotation therewith in order to cut blades of grass, a first U-shaped handle secured at its ends to said motor and extending upwardly about an axis of said motor, said first U-shaped handle comprising parallel, spaced apart legs and an intermediate leg therebetween, a second U-shaped handle removably supported at its ends on one said leg of said first U-shaped handle by means of wing nuts and bolt fasteners, said second U-shaped handle extending horizontally at right angle respectively to said first U-shaped handle, said first U-shaped handle also supporting a speed control rheostat and a switch, said rheostat and switch being along an extension cord from said motor and a free end of said extension cord having a plug for connection to an electric source.

* * * * *